(12) United States Patent
Jiang et al.

(10) Patent No.: US 11,704,772 B2
(45) Date of Patent: Jul. 18, 2023

(54) IMAGE CLASSIFICATION SYSTEM

(71) Applicant: Raytheon Company, Waltham, MA (US)

(72) Inventors: Xiaoai Jiang, Lexington, MA (US); Theodor Ross, North Reading, MA (US); Suzanne Baker, Lincoln, MA (US); Matthew Campbell, Santa Monica, CA (US); Cory Larsen, Cambridge, MA (US)

(73) Assignee: Raytheon Company, Waltham, MA (US)

( * ) Notice: Subject to any disclaimer, the term of this patent is extended or adjusted under 35 U.S.C. 154(b) by 224 days.

(21) Appl. No.: 16/952,596

(22) Filed: Nov. 19, 2020

(65) Prior Publication Data

US 2022/0156885 A1  May 19, 2022

(51) Int. Cl.
| | |
|---|---|
| *G06T 3/60* | (2006.01) |
| *G01S 13/90* | (2006.01) |
| *G06N 3/08* | (2023.01) |
| *G06F 18/22* | (2023.01) |
| *G06F 18/214* | (2023.01) |
| *G06F 18/2411* | (2023.01) |
| *G06N 3/045* | (2023.01) |

(52) U.S. Cl.
CPC ............ *G06T 3/60* (2013.01); *G01S 13/9064* (2019.05); *G06F 18/214* (2023.01); *G06F 18/22* (2023.01); *G06F 18/2411* (2023.01); *G06N 3/045* (2023.01); *G06N 3/08* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,497,158 | A | * | 3/1996 | Schmid .............. G01S 13/9027 342/25 F |
| 6,343,111 | B1 | * | 1/2002 | Avinash ................ A61B 6/482 348/E5.088 |
| 2007/0165916 | A1 | * | 7/2007 | Cloutier .................... G06T 7/12 382/128 |
| 2016/0050350 | A1 | * | 2/2016 | Goel ...................... H04N 23/80 348/241 |
| 2017/0191948 | A1 | * | 7/2017 | Gao ................ G01N 21/95607 |
| 2017/0263241 | A1 | * | 9/2017 | Zhu ........................ G10L 15/16 |
| 2018/0108124 | A1 | * | 4/2018 | Guo ................. G06V 30/18057 |
| 2018/0165546 | A1 | * | 6/2018 | Skans .................... G06N 3/084 |

(Continued)

OTHER PUBLICATIONS

Kullayamma "rotation Identification & correction using CNN" (Year: 2019).*

(Continued)

*Primary Examiner* — Solomon G Bezuayehu
(74) *Attorney, Agent, or Firm* — Daly, Crowley, Mofford & Durkee, LLP

(57) ABSTRACT

A method comprising: obtaining an image; identifying a rotation angle for the image by processing the image with a first neural network; rotating the image by the identified rotation angle to generate a rotated image; classifying the image with a second neural network; and outputting an indication of an outcome of the classification, wherein the first neural network is trained, at least in part, based on a categorical distance between training data and an output that is produced by the first neural network.

17 Claims, 9 Drawing Sheets

(56) References Cited

U.S. PATENT DOCUMENTS

| | | | | |
|---|---|---|---|---|
| 2018/0293710 A1* | 10/2018 | Meyer | ................... | G06T 5/002 |
| 2019/0294874 A1* | 9/2019 | Orlov | ................... | G06N 3/084 |
| 2019/0310360 A1* | 10/2019 | Hershkowitz | ........... | G01S 7/356 |
| 2020/0065156 A1* | 2/2020 | Nag | ..................... | G06F 9/5077 |
| 2021/0012193 A1* | 1/2021 | Yasutomi | ................. | G06N 3/04 |
| 2021/0117773 A1* | 4/2021 | Sollami | ................. | G06N 3/084 |

OTHER PUBLICATIONS

Katayama "Recognition of Rotated Images by Angle Estimation Using Feature Map with CNN", IEEE, 6th Global Conference on Consumer Electronics, 2017, 2 pages.

Kullayamma et al. "Rotation Identification & Correction Using", International Journal of Electronics Engineering; vol. 11 • Issue 2 pp. 366-371 Jun. 2019-Dec. 2019; 6 pages.

Li rt el. "An ISAR Automatic Target Recognition Approach Based on SBR-Based Fast Imaging Scheme and CNN", IEEE, MTT-S International Wireless Symposium, 2020 3 pages.

Toumi et al. "Aircrafts Recognition Using Convolutional Neurons Network", Lab-STICC UAIR CARS 6285. ENS TA Bretagne. Brest. France, Iontniab*nsta-bretagnefr, Nov. 24, 2021, 4 pages.

Search Report and Written Opinion dated Dec. 23, 2021 for PCT Application No. PCT/2021/050595; 14 pages.

\* cited by examiner

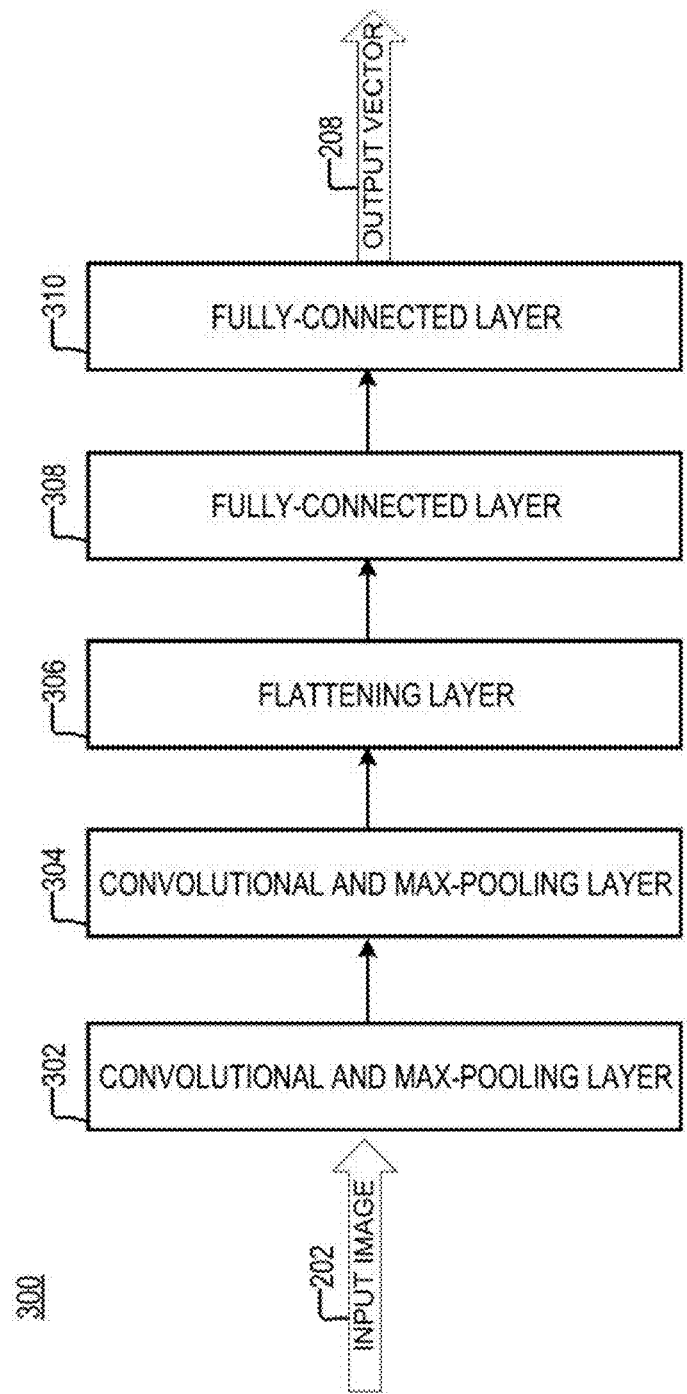

| 204 | | | | | | | | | | | | | | | | | | |
|---|---|---|---|---|---|---|---|---|---|---|---|---|---|---|---|---|---|---|
| ELEMENT INDEX → | 0 | 1 | 2 | 3 | 4 | 5 | 6 | 7 | 8 | 9 | 10 | 11 | 12 | 13 | 14 | 15 | 16 | 17 |
| ELEMENT VALUE → | 0.5 | 0.5 | 0.3 | 0.4 | 0.7 | 0.9 | 0.7 | 0.7 | 0.5 | 0.5 | 0.4 | 0.4 | 0.4 | 0.3 | 0.3 | 0.2 | 0.1 | 0.1 |
| ASSOCIATED ANGLE → | 0° | 10° | 20° | 30° | 40° | 50° | 60° | 70° | 80° | 90° | 100° | 110° | 120° | 130° | 140° | 150° | 160° | 170° |

| 205 | | | | | | | | | | | | | | | | | | |
|---|---|---|---|---|---|---|---|---|---|---|---|---|---|---|---|---|---|---|
| BIT INDEX → | 0 | 1 | 2 | 3 | 4 | 5 | 6 | 7 | 8 | 9 | 10 | 11 | 12 | 13 | 14 | 15 | 16 | 17 |
| BIT VALUE → | 0 | 0 | 0 | 0 | 0 | 1 | 0 | 0 | 0 | 0 | 0 | 0 | 0 | 0 | 0 | 0 | 0 | 0 |
| ASSOCIATED ANGLE → | 0° | 10° | 20° | 30° | 40° | 50° | 60° | 70° | 80° | 90° | 100° | 110° | 120° | 130° | 140° | 150° | 160° | 170° |

FIG. 3B

| TRAINING IMAGE | LABEL |
|---|---|
|  | OUTPUT_VECTOR_1 — 370A |
|  | OUTPUT_VECTOR_2 — 370B |
|  | OUTPUT_VECTOR_3 — 370C |

IMAGE CLASSIFICATION SYSTEM

BACKGROUND

Pattern recognition is the automated recognition of patterns in data. Pattern recognition can be used to extract information from images to recognize faces, text, or license plate numbers, for example. Furthermore, pattern recognition can be used in radar target detection and classification, and it has proven necessary in military surveillance, reconnaissance, and combat missions.

SUMMARY

According to aspects of the disclosure, a method is provided comprising: obtaining an image; identifying a rotation angle for the image by processing the image with a first neural network; rotating the image by the identified rotation angle to generate a rotated image; classifying the image with a second neural network; and outputting an indication of an outcome of the classification, wherein the first neural network is trained based on a categorical distance between training data and an output that is produced by the first neural network.

According to aspects of the disclosure, a system is provided, comprising: a memory; and at least one processor that is operatively coupled to the memory, the at least one processor being configured to perform the operations of: obtaining an image; identifying a rotation angle for the image by processing the image with a first neural network; rotating the image by the identified rotation angle to generate a rotated image; and classifying the image with a second neural network; and outputting an indication of an outcome of the classification, wherein the first neural network is trained based on a categorical distance between training data and an output that is produced by the first neural network.

According to aspects of the disclosure, a non-transitory computer-readable medium storing one or more processor-executable instructions, which, when executed by at least one processor, cause the at least one processor to perform the operations of: obtaining an image; identifying a rotation angle for the image by processing the image with a first neural network; rotating the image by the identified rotation angle to generate a rotated image; and classifying the image with a second neural network; and outputting an indication of an outcome of the classification, wherein the first neural network is trained based on a categorical distance between training data and an output that is produced by the first neural network.

BRIEF DESCRIPTION OF THE DRAWINGS

The foregoing features may be more fully understood from the following description of the drawings in which:

FIG. 3A is a diagram of a convolutional neural network, according to aspects of the disclosure;

FIG. 3B is a diagram of an output vector that is generated by the convolutional neural network of FIG. 3A and a one-hot representation of the output vector, according to aspects of the disclosure;

DETAILED DESCRIPTION

Figure 1:
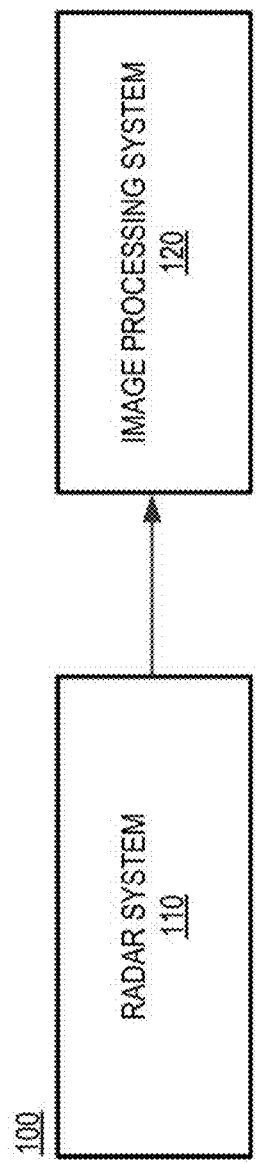
FIG. 1 is a diagram of an example of a system, according to the prior art.

FIG. 1 is a diagram of a computing system 100, according to aspects of the disclosure. As illustrated, the system 100 may include a radar system 110 and an image processing system 120. According to the present example, the radar system includes an Inverse Synthetic Aperture Radar (ISAR) system. However, alternative implementations are possible in which the radar system 110 includes a side-looking airborne radar (SLAR), a synthetic aperture radar (SAR), a perimeter surveillance radar, a counter-battery radar, and/or any other suitable type of radar system. Stated succinctly the present disclosure is not limited to any specific type of radar system being used in conjunction with the image processing system 120.

The image processing system 120 may include any suitable type of computing system that is configured to classify data that is provided by the radar system 110. In some implementations, the image processing system 120 may be configured to classify targets that are acquired by the radar system. Although the radar system 110 and the image processing system 120 are depicted as separate systems, it will be understood that in some implementations they can be integrated together into a single system. Although in the example of FIG. 1 the image processing system 120 is used in conjunction with a radar system, it will be understood that alternative implementations are possible in which the image processing system 120 is used in conjunction with another type of imaging system. For example, the image processing system 120 may be used in conjunction with a medical image system (e.g., a CAT-scan or an MRI system), a SONAR system, a visible-range camera, an infrared camera, and/or any other suitable type of imaging system.

Figure 2A:
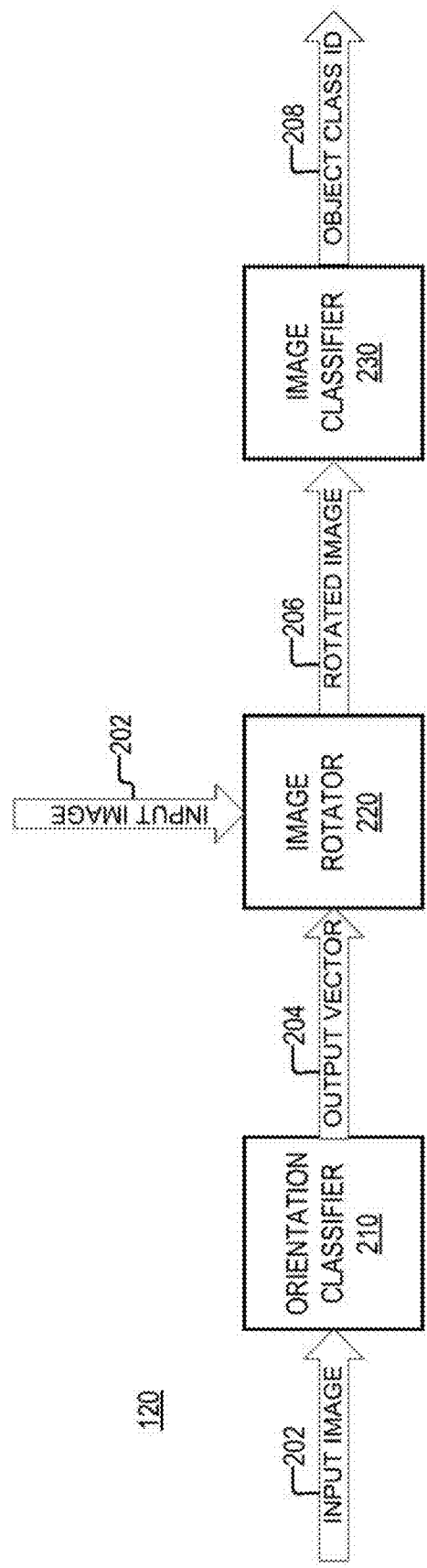
FIG. 2A is a diagram of an example of an image processing system, according to aspects of the disclosure.
Figure 2B:
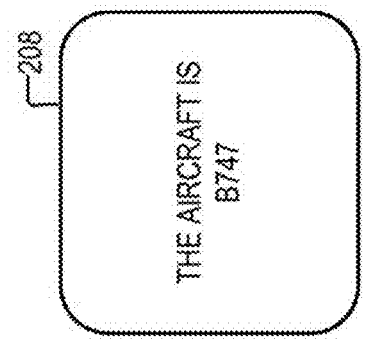
FIG. 2B is a diagram illustrating an example of an input image, a rotated image, and a class identifier, according to aspects of the disclosure.
Figure 2B:
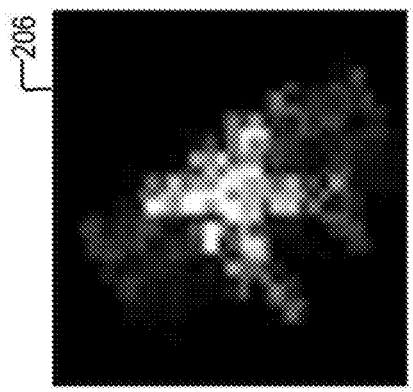
Figure 2B:
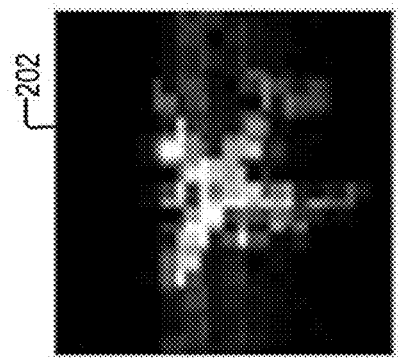

FIGS. 2A-B depicts the image processing system 120 in further detail. As illustrated, the image processing system 120 may include an orientation classifier 210, an image rotator 220, and an image classifier 230. In operation, the orientation classifier 210 may receive an input image 202 and generate an output vector 204 that identifies an angle by which the image is rotated from a "base" orientation. The image rotator 220 may rotate the input image 202 by the angle that is identified in the output vector 204 to produce a rotated image 206. The image classifier 230 may classify the rotated image 206 and output an object class identifier 208 that identifies a class of the image. According to the present example, the input image 202 is an image of an aircraft and the object class identifier includes a string that identifies a type of the aircraft (e.g., B747, F16, Eurofighter, etc.).

According to the present example, the input image 202 is an Inverse Synthetic-Aperture Radar (ISAR) image. The input image 202 may be obtained by (i) receiving an original image from the radar system 110, (ii) filtering the original image (e.g., with a low-pass filter) to produce a filtered image, and (iii) and down-sampling the filtered image to produce the input image 202. According to the present example, the filtered image is down-sampled to a resolution of 28×28 pixels. However, the present disclosure is not limited to any specific resolution.

The orientation classifier 210 may include a first convolutional neural network and the image classifier 230 may include a second convolutional network that is separate from the first convolutional network. In some implementations, the orientation classifier 210 and the image classifier 230 may be executed as separate processes or threads. Although in the present example, each of the orientation classifier 210, the image rotator 220, and the image classifier 230 are implemented in software. Alternative implementations are possible in which any of the orientation classifier 210, the image rotator 220, and the image classifier 230 is implemented in hardware or as a combination of hardware or software.

The orientation classifier 210, as noted above, may employ a first convolutional neural network to determine a rotational offset of the input image 202 (i.e., a rotational offset of an object depicted in the input image 202), relative to a base orientation. As illustrated in FIG. 2B, the base orientation of the image can be a "portrait" orientation. However, it will be understood that the base orientation may be any orientation that is the same as the orientation of images that are used to train the image classifier 230.

The image rotator 220 may be configured to rotate (or de-rotate) the input image 202 by the rotational offset that is determined by the orientation classifier 210. Rotating the input image 202 may include generating a new image (e.g., the rotated image 206) which depicts the same object as the input image 202, and in which the object is rotated by the rotational angle determined by the orientation classifier 210. In some implementations, both the input image 202 and the rotated image 206 may have the same resolution (e.g., 28×28 pixels). Additionally or alternatively, in some implementations, both the input image 202 and the rotated image 206 may have the same aspect ratio. In some implementations, the rotated image 206 may be generated, at least in part, by applying a rotational transformation to the input image 202.

The image classifier 230, as noted above, may employ a second convolutional neural network to classify the rotated image 206. As is known in the art, features learned by convolutional neural networks are not rotationally invariant. In this regard, rotating the input image 202 such that it is placed in an upright orientation for example, before providing it to the image classifier 230, may help improve the accuracy of the classification. As can be readily appreciated, the image classifier 230 may be trained with images that are rotated at random angles. However, this approach may require a larger amount of training data than the present approach.

As noted above, the image processor 120 uses a two-fold approach in which a rotation angle is identified for the image 202, and the image 202 is rotated (or transformed) based on the rotation angle. In general, a neural network can be used to transform (or rotate) an image without having to find a rotation angle first. However, such a method may permit nonlinear manipulation of the image, which could sacrifice the structure of the image. By contrast, the image rotator 220 may support only rotational transformation, and, as such, it might not alter the structure of the image in the same way the neural network approach would. Accordingly, it will be understood that using the image rotator 220 to generate the rotated image 206 (which is subsequently input into the convolutional neural network 300) is advantageous because does not sacrifice the structure of the input image 202.

According to the example of FIGS. 1-7, the input image 202 is an ISAR image, however alternative implementations are possible in which the input image 202 is another type of image, such as a photographic image (e.g., an image captured with a digital camera), a graphics image, a sonar image, a SONAR image, an X-ray image, an MRI image, and/or any other suitable type of image. In this regard, it will be understood that the concepts and ideas described throughout the specification are not limited to the processing of any specific type of image.

FIG. 3A shows the orientation classifier 210 in further detail. As illustrated, the orientation classifier 210 may include a convolutional neural network 300. The convolutional neural network 300 may include: a convolutional and max-pooling layer 302, a convolutional and max-pooling layer 304, a flattening layer 306, a fully connected layer 308, and a fully-connected layer 310. The convolutional neural network 300 may receive the input image 202 as input and output the output vector 204. It will be understood that FIG. 3A is provided as an example only. Those of ordinary skill in the art will readily recognize, after reading this disclosure, that alternative configurations are possible for the convolutional neural network 300, which may include a different sequence of hidden layers, a different number of convolutional layers, and/or a different number fully-connected layers. In this regard, it will be understood that the present disclosure is not limited to any specific implementation of the convolutional neural network 300.

FIG. 3B shows an example of the output vector 204 in further detail. As illustrated, the output vector 204 may include a plurality of elements. Each element in the output vector 204 may correspond to a different classification category (or angle bin in the present case). The value of each element in the output vector 204 may include the probability of the input image 202 belonging to the element's category. According to the example of FIG. 3B, the element with index 0 has a value of 0.5 and is associated with a 0-degree angle; the element with index 1 has a value of 0.5 and is associated with a 10-degree angle; the element with index 2 has a value of 0.3 and is associated with a 20-degree angle; the element with index 3 has a value of 0.4 and is associated with a 30-degree angle; the element with index 4 has a value of 0.7 and is associated with a 40-degree angle; the element with index 5 has a value of 0.9 and is associated with a 50-degree angle; the element with index 6 has a value of 0.7 and is associated with a 60-degree angle; the element with index 7 has a value of 0.7 and is associated with a 70-degree angle; the element with index 8 has a value of 0.5 and is associated with an 80-degree angle; the element with index 9 has a value of 0.5 and is associated with a 90-degree angle; the element with index 10 has a value of 0.4 and is associated with a 100-degree angle; the element with index 11 has a value of 0.4 and is associated with a 110-degree angle; the element with index 12 has a value of 0.4 and is associated with a 120-degree angle; the element with index 13 has a value of 0.3 and is associated with a 130-degree angle; the element with index 14 has a value of 0.3 and is associated with a 140-degree angle; the element with index 15 has a value of 0.2 and is associated with a 150-degree angle; the element with index 16 has a value of 0.1 and is associated with an 160-degree angle; and the element with index 17 has a value of 0.1 and is associated with a 170-degree angle. The output vector 204 indicates that the input image 202 is classified in the 50-degree angle category (because the element at index 5 has the largest value).

FIG. 3B further shows a one-hot representation 205 of the output vector 204. As illustrated, the one-hot representation 205 may include a different bit for each element of the output vector 204. The one-hot representation may be generated by: (i) identifying the largest element in the output vector 204, (ii) identifying the index of the largest element in the output vector 204, (iii) setting the bit in the hot-representation 205 that has the same index as the largest element in the output vector 204 to '1', and (iv) setting all other bits to '0'. According to the example of FIG. 3B, the bit with index 0 has a value of 0 and is associated with a 0-degree angle; the bit with index 1 has a value of 0 and is associated with a 10-degree angle; the bit with index 2 has a value of 0 and is associated with a 20-degree angle; the bit with index 3 has a value of 0 and is associated with a 30-degree angle; the bit with index 4 has a value of 0 and is associated with a 40-degree angle; the bit with index 5 has a value of 1 and is associated with a 50-degree angle; the bit with index 6 has a value of 0 and is associated with a 60-degree angle; the bit with index 7 has a value of 0 and is associated with a 70-degree angle; the bit with index 8 has a value of 0 and is associated with a 80-degree angle; the bit with index 9 has a value of 0 and is associated with a 90-degree angle; the bit with index 10 has a value of 0 and is associated with a 100-degree angle; the bit with index 11 has a value of 0 and is associated with a 110-degree angle; the bit with index 12 has a value of 0 and is associated with a 120-degree angle; the bit with index 13 has a value of 0 and is associated with a 130-degree angle; the bit with index 14 has a value of 0 and is associated with a 140-degree angle; the bit with index 15 has a value of 0 and is associated with a 150-degree angle; the bit with index 16 has a value of 0 and is associated with a 160-degree angle; and the bit with index 17 has a value of 0 and is associated with a 170-degree angle. The one hot representation 205 has the bit at index 5 set to '1' because the input image 205 has been classified in the 50-degree angle category by the convolutional neural network 300. As used throughout the disclosure, the phrase "index of a one-hot representation of an output vector (or label)" shall refer to the index of the bit in the one-hot representation that is set to '1'. Under this definition, the index of the one-hot representation 205 is 5.

As noted above, the convolutional neural network 300 may implement a classification method that labels discrete "bins" of orientation angles as unique categories. The width of each bin is 10 degrees. According to the present disclosure, it has been observed that the accuracy of the classifier deteriorates if bins larger than 10 degrees are used. However, it will be understood that the present disclosure is not limited to any specific bin width. Furthermore, it will be further understood that the number of bins used by the convolutional neural network 300 may vary. In general, the number of bins in the neural network 300 would be the same as the number of bits in the output vector 204.

Figure 3C:
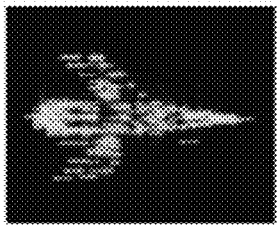
FIG. 3C is a diagram of an example of a training data set, according to aspects of the disclosure.
Figure 3C:
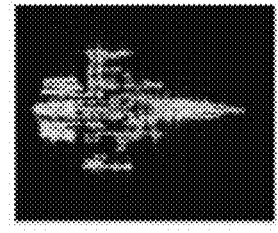
Figure 3C:
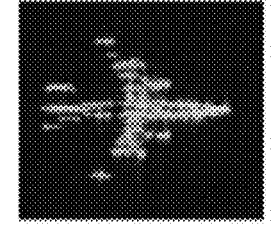

FIG. 3C is a diagram of an example of a training data set 360 that can be used to train the convolutional neural network 300. According to the present example, the training data set includes a plurality of entries 370. Each entry 370 may include a training image and a label corresponding to the training image. The label corresponding to the training image may be the same as an output vector, which the convolutional neural network 300 would generate, when classifying the training image, if the training image were classified correctly. According to the example of FIG. 3C, entry 370A may include a first training image that is associated with a first label (i.e., a first output vector); entry 370B may include a second training image that is associated with a second label (i.e., a second output vector); and entry 370C may include a third training image that is associated with a third label (i.e., a third output vector). Although in the example of FIG. 3C, the training data set 360 includes three training images only, it will be understood that in practice the training data set 360 would have a much larger number of images.

An example of one method for generating training images is now discussed in further detail. According to the example, the training images are generated by Inverse Synthetic Aperture Radar (ISAR) and/or by using a signal processing technique that is performed by ISAR. Although the signal processing technique is discussed in the context of generating training images, it will be understood that the input image 202 may also be generated, at least in part, by using the same or similar signal processing.

In signal processing, a matched filter is obtained by correlating a known delayed signal, with an unknown signal to detect the presence of the known signal in the unknown signal. This is equivalent to convolving the unknown signal with a conjugated time-reversed version of the known signal. Matched filters are commonly used in radar, in which a known signal is sent out, and the reflected signal is examined for common elements of the out-going signal. Pulse compression is an example of matched filtering where the impulse response is matched to input pulse signals. Pulse compression is used to increase the range resolution as well as the signal to noise ratio. This is achieved by modulating the transmitted pulse and then correlating the received signal with the transmitted pulse. The cross-correlation is computed by convolving the received signal with a conjugated and time-reversed version of the transmitted signal.

In some implementations, linear frequency modulation (LFM) waveforms may be incorporated with a point back-scattering model to generate range-Doppler image of a moving target. Suppose $T_1$ is the single chirp pulse duration, $f_c$ is the center frequency of the chirp, and the slope of the chirp pulse is defined as $K=B/T_1$ in which B is the frequency bandwidth. The LFM chirp pulse can be written as:

$$s_0(t) = A_0 e^{2\pi i \left[f_c t + \frac{K}{2} t^2\right]} \text{ for } |t| \leq \frac{T_1}{2} \qquad (1)$$

The returned signal may be re-written by adding time delay term $t_i = 2R_i/c$ ($R_i$ is the relative range w.r.t. the reference point for i-th scatterer, and c is the light speed) to equation (1):

$$s_R(t) = A_R e^{2\pi i \left[f_c(t-t_i) + \frac{K}{2}(t-t_i)^2\right]} \text{ for } |t - t_i| \leq \frac{T_1}{2} \qquad (2)$$

The matched filter response function may be expressed as the conjugated and time-reversed transmitted signal shown in the following form:

$$h(t) = s_0^*(-t) = A_0 e^{2\pi i \left[f_c t - \frac{K}{2} t^2\right]} \qquad (3)$$

Therefore, the pulse compression response is represented as a convolution of the returned signal as in equation (2) with the matched filter response function as in equation (3):

$$s_{out}(t) = \int_{-\infty}^{\infty} s_R(t-\alpha) h(\alpha) d\alpha \qquad (4)$$

The response may be discretized into M samples with the range resolution being $$\Delta r = \frac{c}{2B},$$

and N pulses with cross-range resolution being $$\Delta r_{cr} = \frac{\lambda}{2\Omega T},$$

where $\lambda$ is the wavelength, $\Omega$ is related to the rotation angle, and T is the total dwell time T=N/PRF.

An example for generating training images is now discussed in further detail. According to the example, 3D airplane CAD models may be used to generate a representative application-based dataset. For example, four airplane CAD models may be used: Boeing 747, Euro-fighter EF2000, F16 and F35. These models may be limited to providing geometrical information only. The 3D airplane models may be run through the physical optics program POFACETS to generate target Radar Cross-Section (RCS) estimates for each target aspect angle. The target mesh nodes may be down-selected and used as representative radar scatterer points. Randomization of scatter locations and amplitudes may be used throughout to increase the amount of variation within each class. In some implementations, the values of $f_c$, B, and $T_1$ may be set as follows: $f_c$=10 GHz, B=1 GHz, $T_1$=0.4 ms.

Furthermore, to simulate real-world effects in the ISAR images object shadowing and simulated delayed returns may be imparted on training images that are generated based on CAD models. Shadowing occurs when scatterers on an object are occluded by the hull of that object. The shadowing may be based on aspect angle for given radar line-of-sight. Delayed returns occur when radar energy bounces off multiple surfaces on the object. For example, when radar energy enters into an open cavity on an object. In some implementations, delayed returns may be randomly generated to simulate representative multi-bounce characteristics.

According to the example of FIGS. 1-7, the training images that are used to train the convolutional neural network 300 are ISAR images, however alternative implementations are possible in which another type of images is used to train the convolutional neural network 300, such as a photographic image (e.g., an image captured with a digital camera), a graphics image, a sonar image, an X-ray image, an MRI image, and/or any other suitable type of image. In this regard, it will be understood that the concepts and ideas described throughout the specification are not limited to using any specific type of image to train the convolutional neural network 300.

An example of a method for training the convolutional neural network 300 is now discussed in further detail. According to the method, the convolutional neural network 300 may be trained by using a gradient descent algorithm that is designed to minimize the value of the loss function Lcat. The loss function Lcat may be defined as follows:

$$Lcat = l_H + l_\theta \quad (5)$$

$$l_H = -\Sigma_{i=0}^{n-1} \hat{y}_i \log y_i \quad (6)$$

$$l_\theta = \min(((\xi_y - \xi_{\hat{y}})\% K), ((\xi_{\hat{y}} - \xi_y)\% K)) \quad (7)$$

where i is an index of an element in an output vector that is generated for a training image in the training data set 360;

$y_i$ is the i-th element of the output vector that is generated for the training image; $\hat{y}_i$ is the i-th element in a label that is associated with the training image; $\xi_y$ is the index of the largest element in the output vector $$\left(\text{e.g., } \xi_y = \underset{i}{\operatorname{argmax}}(y_i)\right),$$

$\xi_{\hat{y}}$ is the index of the one-hot representation of the label $\hat{y}$ $$\left(\text{e.g., } \xi_{\hat{y}} = \underset{i}{\operatorname{argmax}}(y_i)\right)$$

(i.e., the index of the bit in the one-hot representation of $\hat{y}$ that is set to '1'—it will be recalled that $\hat{y}$ may have the same format as an output vector); and K is a count of classes that are associated with the convolutional neural network 300 (e.g., a count of bins that are implemented by the network). It will be understood that the definition of a categorical distance is not limited to Equation 7.

Figure 4:
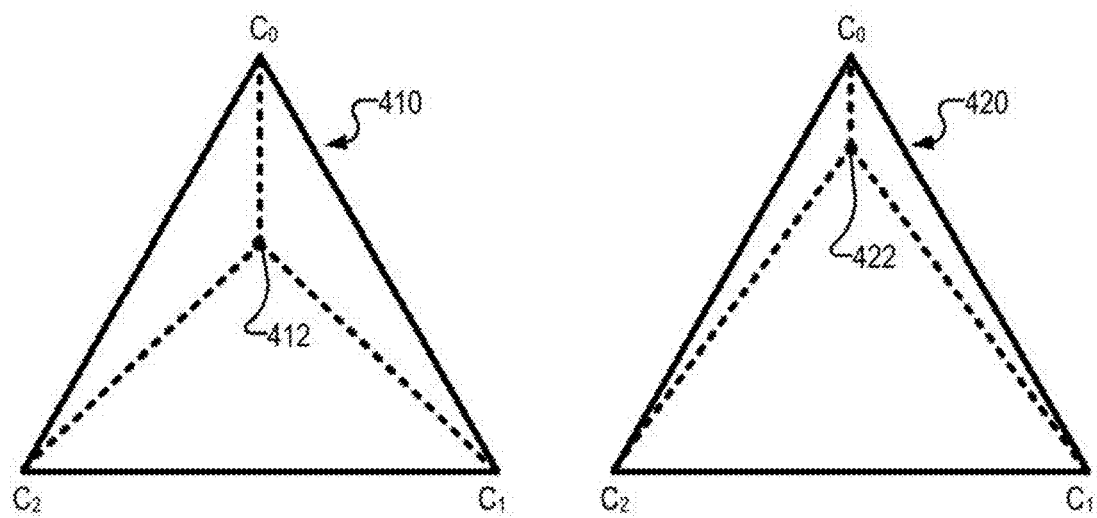
FIG. 4 is a plot of output vectors that are generated by a neural network, according to aspects of the disclosure.

The term $l_H$ represents a standard cross-entropy loss. The term $l_\theta$ represents a categorical distance. The difference between the entropy loss term $l_H$ and the categorical distance $l_\theta$ is now discussed with respect to FIG. 4. FIG. 4 shows a plot 410 of an output vector 412 that is generated by a 3-class neural network in response to a first input image. The neural network is configured to classify any image that is input into it in one of three classes—i.e., class $C_0$, class $C_1$, and class $C_2$. FIG. 4 further shows a plot 420 of an output vector 422 that is generated by the same neural network in response to a second input image. The correct classification of the first input image and the second input image is class $C_2$. Both output vectors have a highest value for class $C_0$ and will therefore be classified, incorrectly, in class $C_0$. Because both input images are classified incorrectly in the same class (i.e., class $C_0$), the value of $l_\theta$ for each of the input images will be the same. However, in the example of FIG. 4, the first output vector 412 has a much higher value for the correct class ($C_2$) than the second output vector 422. For this reason, the value of $l_H$ for the first input image will be lower than the value of $l_H$ for the second input image. Put differently, $l_H$ is a measure of how different is the probability mass distribution of a label corresponding to a training image from the output vector that is produced by the convolutional network for the training image. By contrast, $l_\theta$ is a categorical distance—namely distance between the correct category of a training image and the category that has been assigned to the training image by the convolutional neural network 300. The value of $l_H$ would normally depend on all probabilities in the output vector that is produced by the convolutional neural network 300 (i.e., on all elements of the output vector), whereas the value of $l_\theta$ would depend on the index of the largest probability in the output vector (i.e., on the index of the largest element of the output vector).

The term $l_\theta$ is, in essence, a circular absolute error term. It incurs no extra error when the predicted class matches the correct class, but it penalizes incorrect classifications further from the desired angle bin. This loss strategy is very granular; it does not take into account the specific values of each prediction vector y, only which simplex vertex it is closest to and penalizes accordingly. The latter behavior is compensated for by the standard categorical cross-entropy loss term $l_H$.

In some respects, the addition of the term $l_\theta$ helps the convolutional neural network 300 maintain high accuracy with a comparatively low number of neurons. Keeping the number of neurons in the convolutional neural network 300 low is advantageous, because it makes the convolutional neural network 300 less susceptible to jamming and/or deceptive tactics that aim to alter the radar signature of targets.

As noted above, training the convolutional neural network 300 may entail finding coefficient and bias values for neurons in the convolutional neural network 300 for which the loss function Lcat is minimized. In this regard, training the convolutional neural network 300 with the loss function Lcat causes the convolutional neural network 300 to include a set of the coefficient and bias values that are specific to (and/or derivable from) the loss function Lcat (and the training data set). By contrast, if the convolutional neural network 300 were to be trained with another loss function (and the same training data set), the convolutional neural network 300 may include a different set of coefficient and bias values (when all other characteristics of the method for training the two neural networks are held equal). In other words, training the convolutional neural network 300 with the loss function Lcat may impart, at least in part, a specific configuration on the convolutional neural network 300 that is specific (and/or directly related) to the loss function Lcat. Or put differently, the loss function Lcat encourages the convolutional neural network 300 to cluster classification attempts around the correct category. According to the present disclosure, it has been observed that using the categorical distance $l_\theta$ to train the convolutional network 300 may improve the accuracy of the convolutional neural network 300 with respect to images that contain noise due to delayed return or noise due to shadowing (such as ISAR images or other types of radar images).

Figure 5:
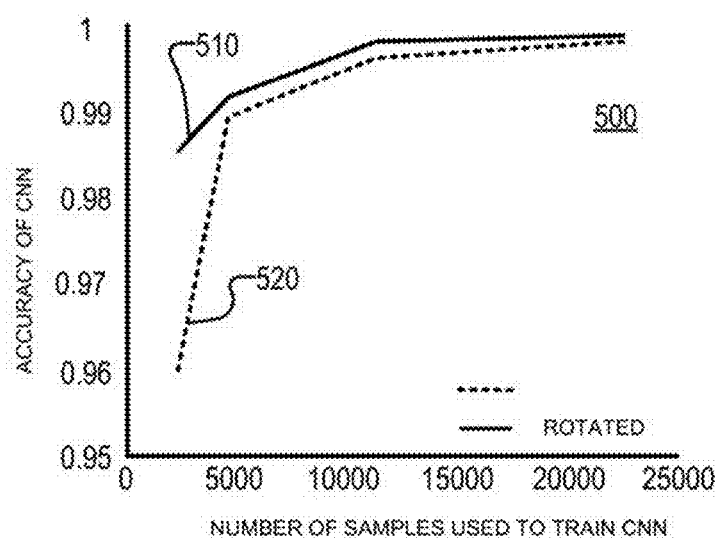
FIG. 5 is a plot illustrating the accuracy of the convolutional neural network of FIG. 3A, according to aspects of the disclosure.

FIG. 5 shows a plot 500, which compares the performance of the image processing system 120 to that of a conventional image classifier. The conventional image classifier is a convolutional neural network that includes the following sequence of layers: (i) a convolutional layer, (ii) a max-pool layer, (iii) a convolutional layer, (iv) a max-pool layer, (v) a flattening layer, a (vi) a dense layer, (vii) a drop-out layer (viii) a dense layer, and (ix) a dense layer. The conventional image classifier is set to include a similar number of tunable parameters as the convolutional neural network 300. The conventional neural network is trained by using randomly rotated images. Unlike the image classifier 230, the conventional image classifier classifies images that are not rotated beforehand. In the example of FIG. 5, the X-axis of the plot 500 corresponds to the size of a training data set that is used to train the image classifier 230 and the conventional image classifier, while the Y-axis of the plot 500 corresponds to accuracy. Shown in the plot 500 are a curve 510 and a curve 520. The curve 510 shows the accuracy of the image classifier 230 and the curve 520 shows the accuracy of the conventional image classifier. Together the curve 510 and the curve 520 illustrate that the introduction of the orientation classifier 210 (which incorporates the convolutional neural network 300) results in the image processing system 120 having a higher accuracy than the conventional image classifier, when a small training data set is used. In various specialized applications, such as recognition of aircraft, large training data sets may be unavailable. In such applications, using the image processing system 120 to perform image classification may be advantageous because it could result in higher accuracy.

Figure 6:
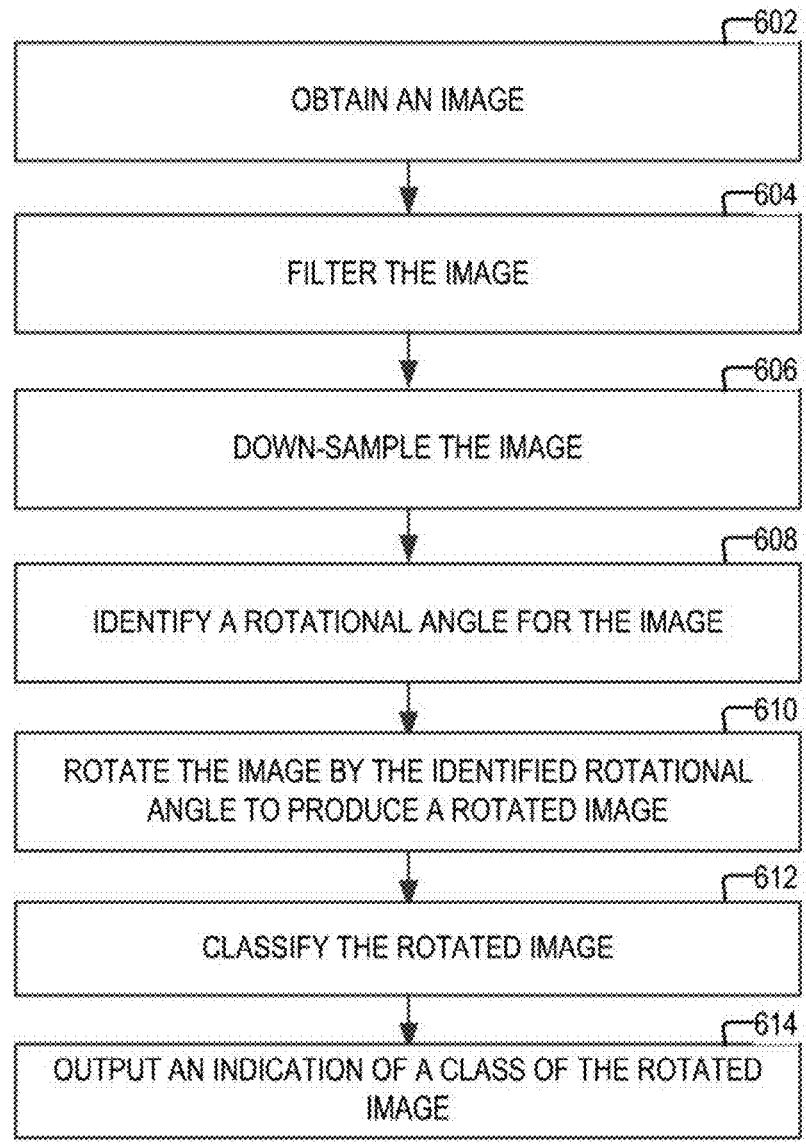
FIG. 6 is a flowchart of an example of a process, according to aspects of the disclosure.

FIG. 6 is a flowchart of an example of a process 600, according to aspects of the disclosure. At step 602, the image processing system 120 obtains an image from the radar system 110. At step 604, the image processing system 120 filters the obtained image with a low-pass filter. At step 606, the image processing system 120, down-samples the image to predetermined resolution (e.g., 28×28 pixels, etc.) to produce the input image 202. At step 608, the image processing system 120 identifies a rotational angle for the input image 202 by using the orientation classifier 210. At step 610, the image processing system 120 uses the image rotator 220 to rotate the input image 202 by the identified angle to produce the rotated image 206. Ideally, in some implementations, if the rotational angle is determined correctly, the rotation would substantially align (e.g., within 10 degrees) the orientation of an object that is depicted in the image (e.g., an aircraft) with the orientation of similar objects in training images that are used to the train the convolutional neural network. At step 612, the image processing system 120 classifies the rotated image by using image classifier 230. At step 614, the image processing system outputs an indication of an outcome of the classification. According to the present example, the image processing system 120 outputs an indication of a class identifier that is assigned to the input image by the image classifier 230.

Figure 7:
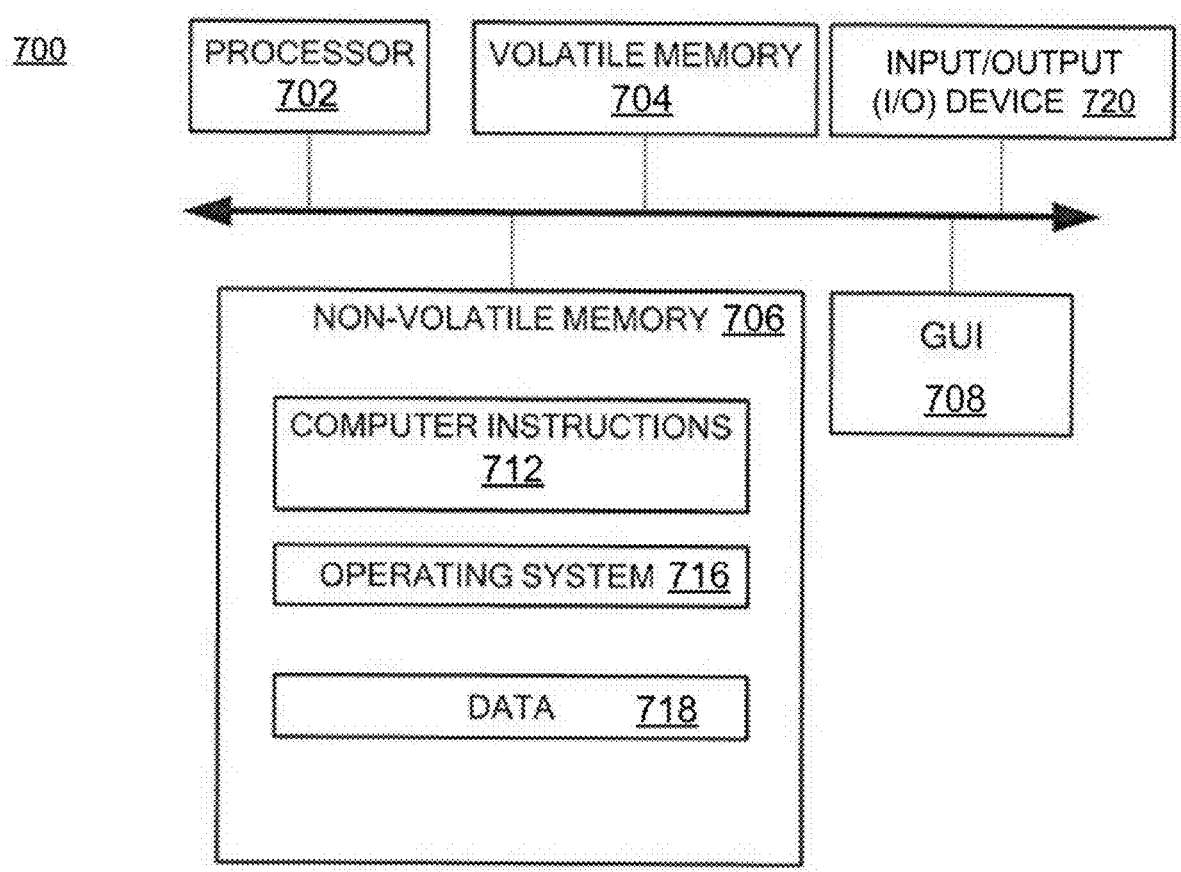
FIG. 7 is a diagram of an example of a computing device, according to aspects of the disclosure.

Referring to FIG. 7, computing device 700 that can be used to implement, at least in part, the image processing system 120. As illustrated, the computing device 700 may include processor 702, volatile memory 704 (e.g., RAM), non-volatile memory 706 (e.g., a hard disk drive, a solid-state drive such as a flash drive, a hybrid magnetic and solid-state drive, etc.), graphical user interface (GUI) 708 (e.g., a touchscreen, a display, and so forth) and input/output (I/O) device 720 (e.g., a mouse, a keyboard, etc.). Non-volatile memory 706 stores computer instructions 712, an operating system 716 and data 722 such that, for example, the computer instructions 712 are executed by the processor 702 out of volatile memory 704. Program code may be applied to data entered using an input device of GUI 708 or received from I/O device 720.

Processor 702 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard-coded into the electronic circuit or soft coded by way of instructions held in a memory device. A "processor" may perform the function, operation, or sequence of operations using digital values or using analog signals. In some embodiments, the "processor" can be embodied in an application-specific integrated circuit (ASIC). In some embodiments, the "processor" may be embodied in a microprocessor with associated program memory. In some embodiments, the "processor" may be embodied in a discrete electronic circuit. The "processor" may be analog, digital or mixed-signal. In some embodiments, the "processor" may be one or more physical processors or one or more "virtual" (e.g., remotely located or "cloud") processors.

The processes described herein are not limited to use with hardware and software of FIG. 7; they may find applicability in any computing or processing environment and with any type of machine or set of machines that is capable of running a computer program. The processes described herein may be implemented in hardware, software, or a combination of the two. The processes described herein may be implemented in computer programs executed on programmable computers/machines that each includes a processor, a non-transitory machine-readable medium or another article of manufacture that is readable by the processor (including volatile and non-volatile memory and/or storage elements), at least one input device, and one or more output devices. Program code may be applied to data entered using an input device to perform any of the processes described herein and to generate output information.

The system may be implemented, at least in part, via a computer program product, (e.g., in a non-transitory machine-readable storage medium such as, for example, a non-transitory computer-readable medium), for execution by, or to control the operation of, data processing apparatus (e.g., a programmable processor, a computer, or multiple computers). Each such program may be implemented in a high-level procedural or object-oriented programming language to work with the rest of the computer-based system. However, the programs may be implemented in assembly, machine language, or Hardware Description Language. The language may be a compiled or an interpreted language, and it may be deployed in any form, including as a stand-alone program or as a module, component, subroutine, or another unit suitable for use in a computing environment. A computer program may be deployed to be executed on one computer or multiple computers at one site or distributed across multiple sites and interconnected by a communication network. A computer program may be stored on a non-transitory machine-readable medium that is readable by a general or special purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se.

Having described preferred embodiments, which serve to illustrate various concepts, structures and techniques, which are the subject of this patent, it will now become apparent that other embodiments incorporating these concepts, structures and techniques may be used. Accordingly, it is submitted that the scope of the patent should not be limited to the described embodiments but rather should be limited only by the spirit and scope of the following claims.

The invention claimed is:

1. A method comprising:
    obtaining an image;
    identifying a rotation angle for the image by processing the image with a first neural network;
    rotating the image by the identified rotation angle to generate a rotated image;
    classifying the image with a second neural network; and
    outputting an indication of an outcome of the classification,
    wherein the first neural network is trained, at least in part, based on a categorical distance between training data and an output that is produced by the first neural network, the categorical distance being based on a distance between an index of a largest element in an output vector that is generated by the first neural network for a training image and an index corresponding to a label that is associated with the training image, and
    wherein the categorical distance is defined as follows;

$$l_\theta = \min(((\xi_y - \xi_{\hat{y}}) \% K), ((\xi_{\hat{y}} - \xi_y) \% K)),$$

where $\xi_y$ is the index of the largest element in the output vector that is generated by the first neural network for the training image, K is a count of classes that are associated with the first neural network, and $\xi_{\hat{y}}$ is the index corresponding to the label that is associated with the training image, the index corresponding to the label begin an index of a one-hot representation of the label.

2. The method of claim 1, wherein the first neural network includes a convolutional neural network.

3. The method of claim 1, wherein the image includes at least one of noise due to shadowing or noise due to delayed return.

4. The method of claim 1, wherein the first neural network is trained based on a sum of a categorical cross-entropy term that is associated with the output of the first neural network and the categorical distance.

5. The method of claim 1, wherein the image includes a range doppler image of a moving target.

6. The method of claim 1, wherein the image includes an Inverse Synthetic-Aperture Radar (ISAR) image.

7. A system, comprising:
    a memory; and
    at least one processor that is operatively coupled to the memory, the at least one processor being configured to perform the operations of:
    obtaining an image;
    identifying a rotation angle for the image by processing the image with a first neural network;
    rotating the image by the identified rotation angle to generate a rotated image;
    classifying the image with a second neural network; and
    outputting an indication of an outcome of the classification,
    wherein the first neural network is trained, at least in part, based on a categorical distance between training data and an output that is produced by the first neural network, the categorical distance being based on a distance between an index of a largest element in an output vector that is generated by the first neural network for a training image and an index corresponding to a label that is associated with the training image, and
    wherein the categorical distance is defined as follows;

$$l_\theta = \min(((\xi_y - \xi_{\hat{y}}) \% K), ((\xi_{\hat{y}} - \xi_y) \% K)),$$

where $\xi_y$ is the index of the largest element in the output vector that is generated by the first neural network for the training image, K is a count of classes that are associated with the first neural network, and $\xi_{\hat{y}}$ is the index corresponding to the label that is associated with the training image, the index corresponding to the label begin an index of a one-hot representation of the label.

8. The system of claim 7, wherein the first neural network includes a convolutional neural network.

9. The system of claim 7, wherein the image includes at least one of noise due to shadowing or noise due to delayed return.

10. The system of claim 7, wherein the first neural network is trained based on a sum of a categorical cross-entropy term that is associated with the output of the first neural network and the categorical distance.

11. The system of claim 7, wherein the image includes a range doppler image of a moving target.

12. The system of claim 7, wherein the image includes an Inverse Synthetic-Aperture Radar (ISAR) image.

13. A non-transitory computer-readable medium storing one or more processor-executable instructions, which, when executed by at least one processor, cause the at least one processor to perform the operations of:
- obtaining an image;
- identifying a rotation angle for the image by processing the image with a first neural network;
- rotating the image by the identified rotation angle to generate a rotated image;
- classifying the image with a second neural network; and
- outputting an indication of an outcome of the classification,
- wherein the first neural network is trained, at least in part, based on a categorical distance between training data and an output that is produced by the first neural network, the categorical distance being based on a distance between an index of a largest element in an output vector that is generated by the first neural network for a training image and an index corresponding to a label that is associated with the training image, and
- wherein the categorical distance is defined as follows;

$$l_\theta = \min(((\xi_y - \xi_{\hat{y}})\%K), ((\xi_{\hat{y}} - \xi_y)\%K)),$$

where $\xi_y$ is the index of the largest element in the output vector that is generated by the first neural network for the training image, K is a count of classes that are associated with the first neural network, and $\xi_{\hat{y}}$ is the index corresponding to the label that is associated with the training image, the index corresponding to the label begin an index of a one-hot representation of the label.

14. The non-transitory computer-readable medium of claim 13, wherein the first neural network includes a convolutional neural network.

15. The non-transitory computer-readable medium of claim 13, wherein the image includes at least one of noise due to shadowing or noise due to delayed return.

16. The non-transitory computer-readable medium of claim 13, wherein the first neural network is trained based on a sum of a categorical cross-entropy term that is associated with the output of the first neural network and the categorical distance.

17. The non-transitory computer-readable medium of claim 13, wherein the image includes a range doppler image of a moving target.

* * * * *